US009445321B2

(12) United States Patent
Zhu et al.

(10) Patent No.: US 9,445,321 B2
(45) Date of Patent: Sep. 13, 2016

(54) CONNECTED MODE MOBILITY BETWEEN RADIO ACCESS NETWORKS

(71) Applicant: QUALCOMM Incorporated, San Diego, CA (US)

(72) Inventors: Xipeng Zhu, Beijing (CN); Francesco Pica, San Diego, CA (US); Shyamal Ramachandran, San Diego, CA (US); Miguel Griot, La Jolla, CA (US); Mungal Singh Dhanda, Slough (GB); Masato Kitazoe, Tokyo (JP); Wolfgang Granzow, Nuremberg (DE); Aziz Gholmieh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/385,984

(22) PCT Filed: Mar. 14, 2013

(86) PCT No.: PCT/CN2013/072637
§ 371 (c)(1),
(2) Date: Sep. 17, 2014

(87) PCT Pub. No.: WO2013/149544
PCT Pub. Date: Oct. 10, 2013

(65) Prior Publication Data
US 2015/0056993 A1 Feb. 26, 2015

(30) Foreign Application Priority Data

Apr. 1, 2012 (WO) .............. PCT/CN2012/073458

(51) Int. Cl.
*H04W 4/00* (2009.01)
*H04W 36/00* (2009.01)
(Continued)

(52) U.S. Cl.
CPC ......... *H04W 36/0066* (2013.01); *H04W 36/36* (2013.01); *H04W 60/04* (2013.01)

(58) Field of Classification Search
CPC .................. H04W 36/0066; H04W 60/04
See application file for complete search history.

(56) References Cited

U.S. PATENT DOCUMENTS

2010/0064038 A1   3/2010  Hu
2010/0317348 A1   12/2010  Burbidge et al.
(Continued)

FOREIGN PATENT DOCUMENTS

CN    101399750 A    4/2009
CN    101500223 A    8/2009
(Continued)

OTHER PUBLICATIONS

International Search Report and Written Opinion dated Jun. 20, 2013 from PCT/CN2013/072637.
(Continued)

*Primary Examiner* — Erin File
(74) *Attorney, Agent, or Firm* — Arent Fox LLP

(57) ABSTRACT

A method, an apparatus, and a computer program product for wireless communication are provided in which a user equipment performs an inter-radio access technology (RAT) mobility procedure from a first network to a second network while idle mode signaling reduction (ISR) is active, locally deactivates ISR in connection with completion of the inter-RAT mobility procedure, and initiates a location management procedure in the second network. Depending on the respective type of the first and second network, and the connection state of the UE with respect to the first network, the mobility procedure may be performed in response to a mobility command received from the first network, or in response to a mobility condition of the first network as detected by the UE.

52 Claims, 16 Drawing Sheets

(51) Int. Cl.
*H04W 60/04* (2009.01)
*H04W 36/36* (2009.01)

(56) References Cited

U.S. PATENT DOCUMENTS

| | | | |
|---|---|---|---|
| 2012/0120789 A1* | 5/2012 | Ramachandran et al. | 370/220 |
| 2013/0157661 A1* | 6/2013 | Bhaskaran | H04W 60/00 455/436 |
| 2013/0272268 A1* | 10/2013 | Xu et al. | 370/331 |
| 2014/0105028 A1* | 4/2014 | Bhaskaran et al. | 370/242 |

FOREIGN PATENT DOCUMENTS

| | | |
|---|---|---|
| CN | 102026143 A | 4/2011 |
| EP | 2211511 A1 | 7/2010 |
| EP | 2302844 A1 | 3/2011 |
| WO | 2010051873 A1 | 5/2010 |

OTHER PUBLICATIONS

Chapter II Demand and Amendment under Article 34 as filed on Jan. 28, 2014 from PCT/CN2013/072637.

International Search Report and Written Opinion—PCT/CN2012/073458—ISA/EPO—Jan. 17, 2013.

Nokia Siemens Networks: "Clarification of ISR usage for CSFB", 3GPP Draft; S2-087331 WAS 7309-V0, 3rd Generation Partnership Project (3GPP), Mobile Competence Centre ; 650, Route Des Lucioles F-06921 Sophia-Antipolis Cedex ; France, no. China; Oct. 17, 2008, XP050331790, [retrieved on Oct. 17, 2008] *paragraph [07.7].

Supplementary European Search Report—EP13772073—Search Authority—Munich—Oct. 30, 2015.

* cited by examiner

CONNECTED MODE MOBILITY BETWEEN RADIO ACCESS NETWORKS

BACKGROUND

1. Field

The present disclosure relates generally to communication systems, and more particularly, to methods for transitioning between cells in a wireless communication system.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method of wireless communication ignores or locally deactivates idle mode signaling reduction (ISR) when a mobility command, such as a cell change order (CCO), is received or when a reselection is performed.

In an aspect of the disclosure, a user equipment (UE) may determine that a mobility procedure is required while ISR is active. The mobility procedure may be required when a mobility command is received or a reselection is required. The mobility command may comprise a CCO. Upon receiving the mobility command, the UE may move from a first network to a second network. The UE may initiate a location management procedure in the second network. The UE may transmit an uplink signal to update the network. In some embodiments, initiating the location management procedure may include deactivating the ISR locally. In some embodiments, the UE may ignore the ISR.

In an aspect of the disclosure, initiating the location management procedure includes sending an update request comprising one or more of a routing area update (RAU) request, a tracking area update (TAU) request, and a cell update request in the uplink signal. Sending the update request may cause a network gateway to release resources allocated to the UE.

In one example, the second network may comprise a GSM/Edge radio access network (GERAN), and the location management procedure may comprise an RAU procedure. In another example, the second network comprises a GERAN, and initiating the location management procedure includes sending at least one of a cell update message or a cell notification message. In another example, the second network comprises an evolved universal mobile telecommunications system terrestrial radio access network (E-UTRAN) and the location management procedure comprises a TAU procedure.

In an aspect of the disclosure, the first network may employ a radio access technology (RAT) that is different from the RAT employed by the second network. In one example, the first network comprises a GERAN, the second network comprises an E-UTRAN, and the mobility command comprises a CCO command. In another example, the first network comprises a GERAN and the second network comprises an E-UTRAN, and the mobility command comprises a reselection from GERAN packet transfer mode.

In an aspect of the disclosure, the UE determines if data is available for transmitting on the second network, generates data for transmission on a packet network when no data is determined to be available, and transmits an uplink signal to obtain a grant from a base station of the second network for sending the generated data. The data generated for transmission on the packet network may comprise a null LLC PDU if the second network is GERAN. Transmitting the uplink signal may comprise sending a channel request. Initiating the location management procedure may comprise sending an RAU request or a TAU request to a serving general packet radio service support node (SGSN). Initiating the location management procedure may comprise sending a cell update message or a cell notification message to an SGSN.

In another aspect, a method, an apparatus, and a computer program product for wireless communication are provided in which a user equipment performs an inter-radio access technology (RAT) mobility procedure from a first network to a second network while idle mode signaling reduction (ISR) is active, locally deactivates ISR in connection with completion of the inter-RAT mobility procedure, and initiates a location management procedure in the second network. Depending on the respective type of the first and second network, and the connection state of the UE with respect to the first network, the mobility procedure may be performed in response to a mobility command received from the first network, or in response to a mobility condition of the first network as detected by the UE.

DETAILED DESCRIPTION

Figure 1:
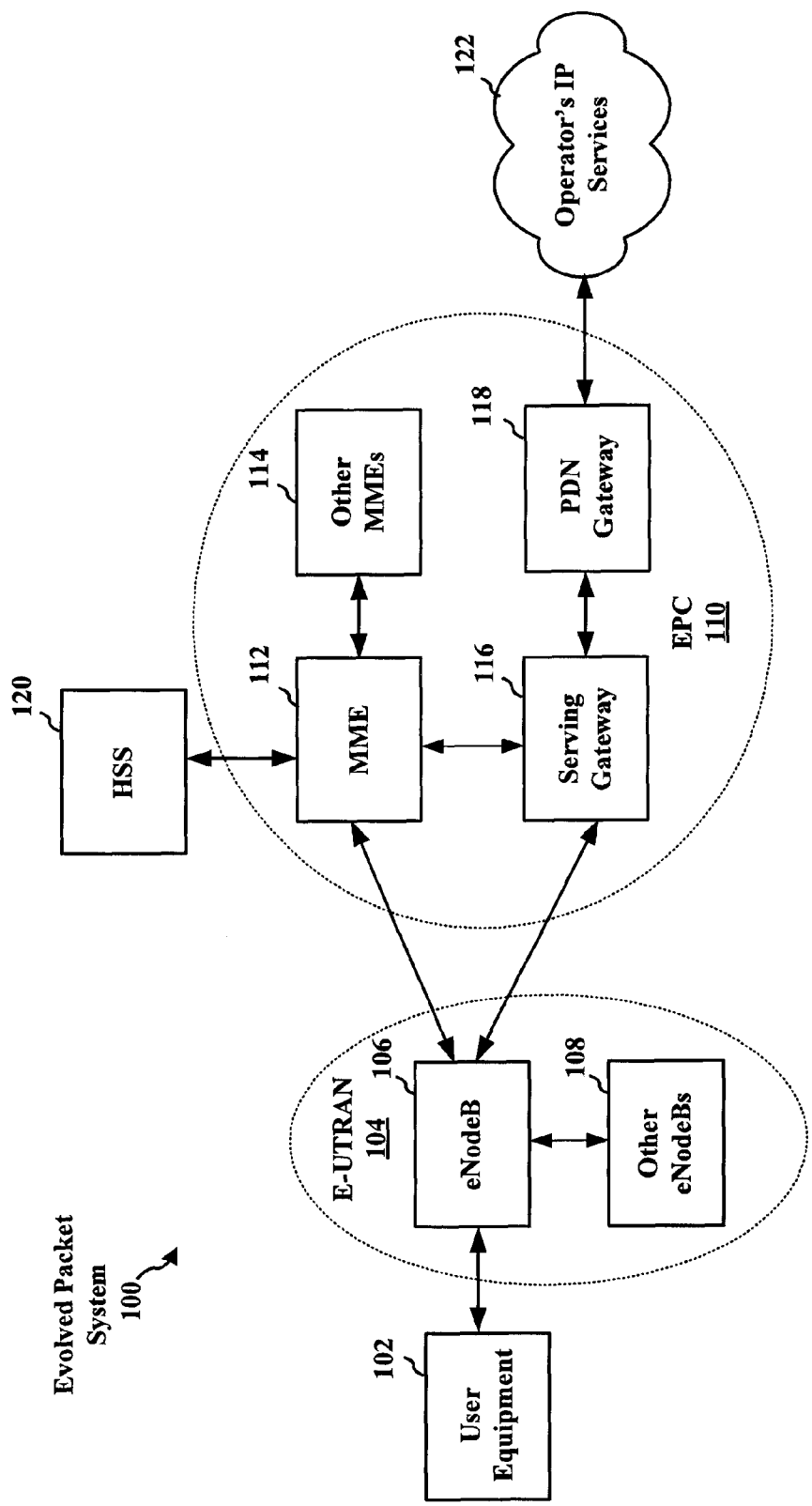
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more UE 102, an E-UTRAN 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions.

The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
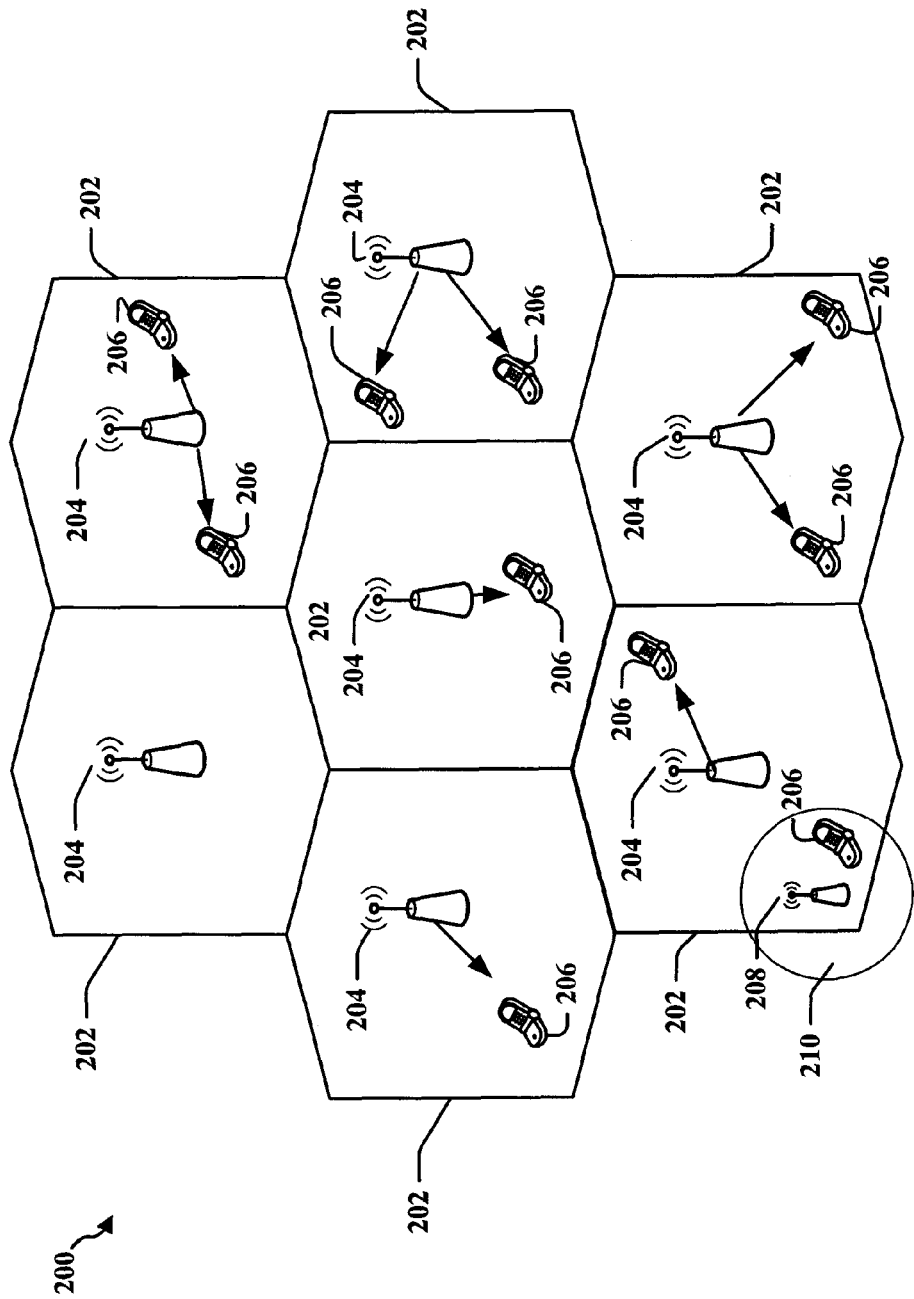
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
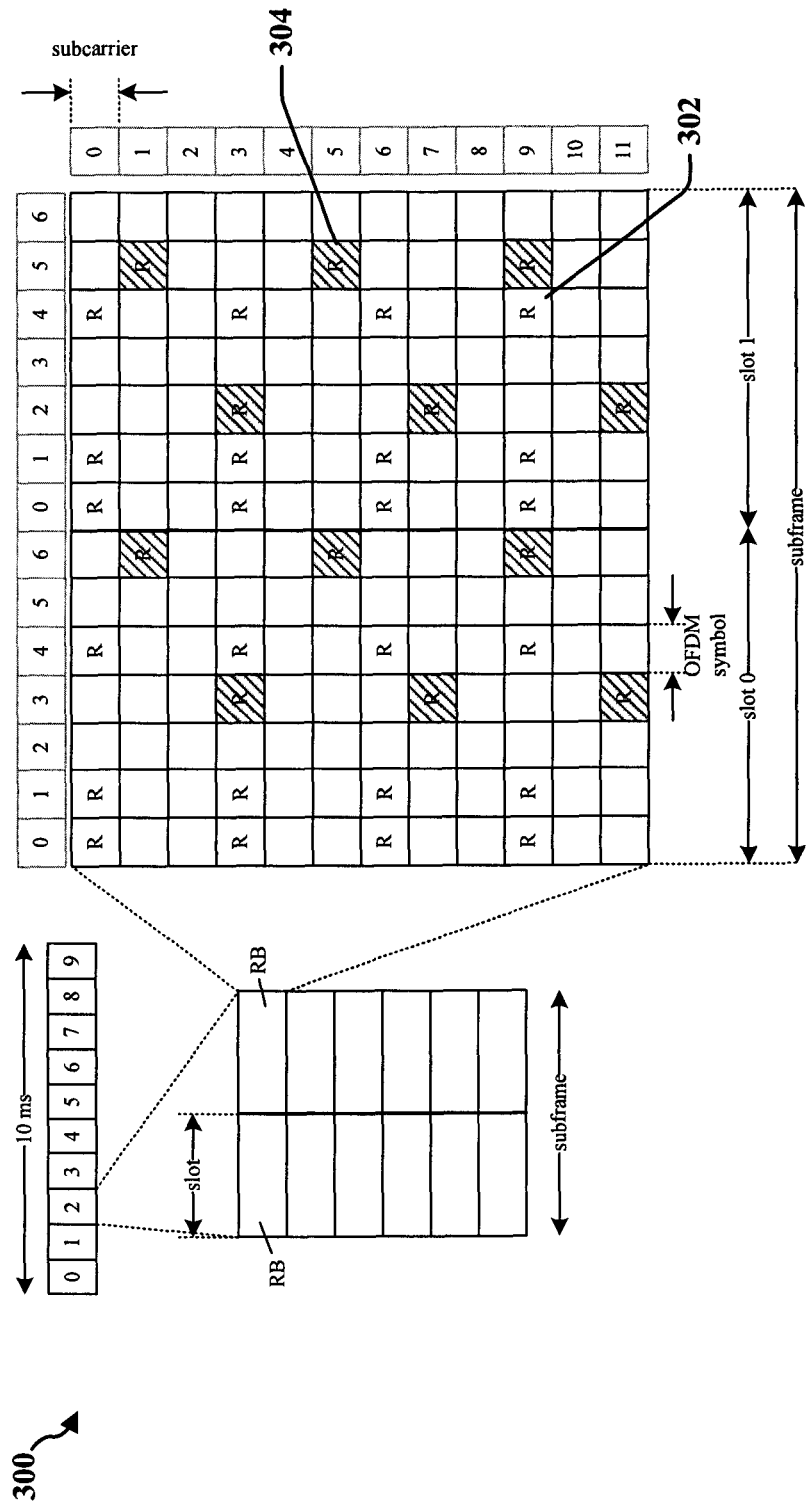
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
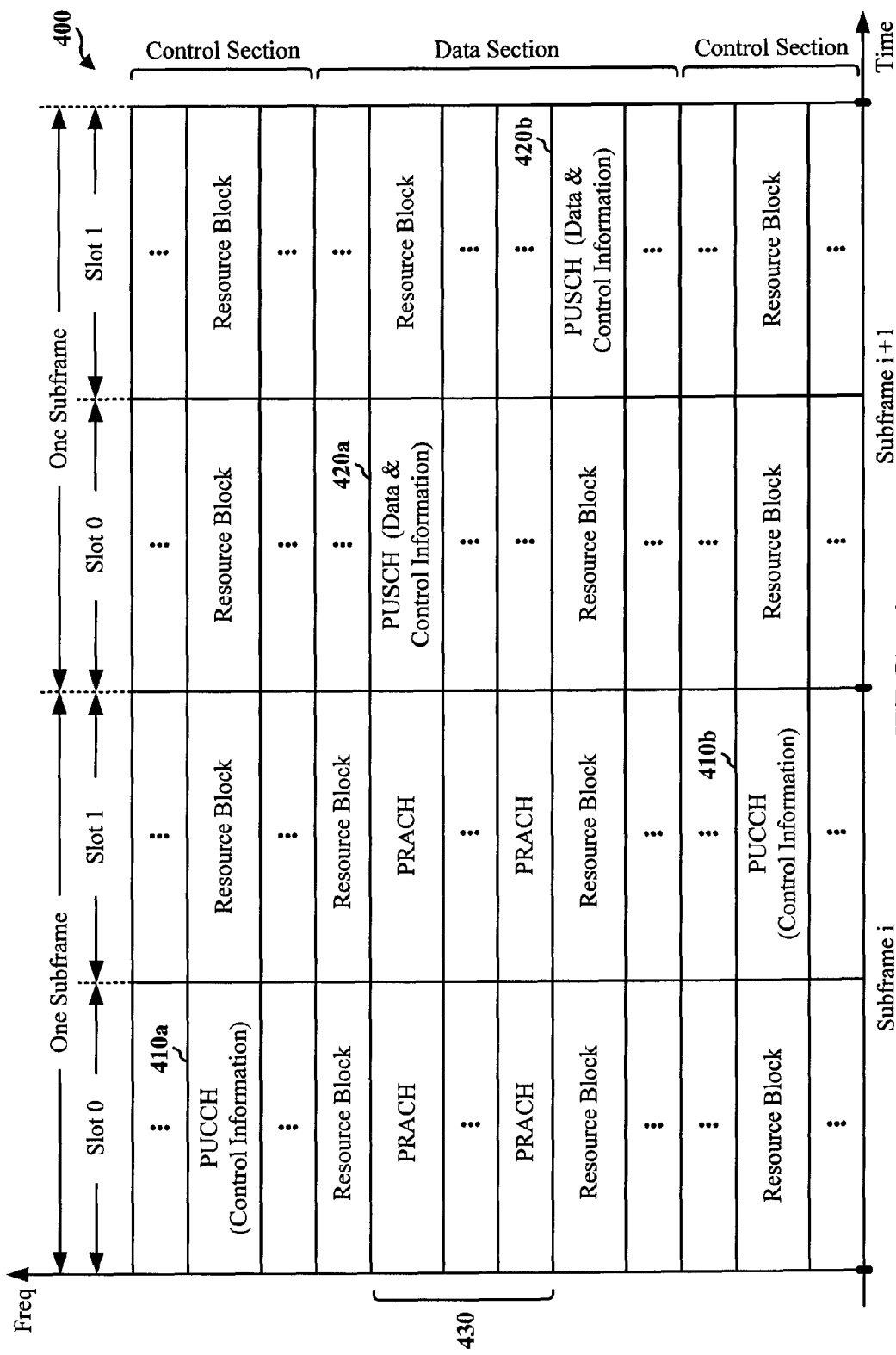
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
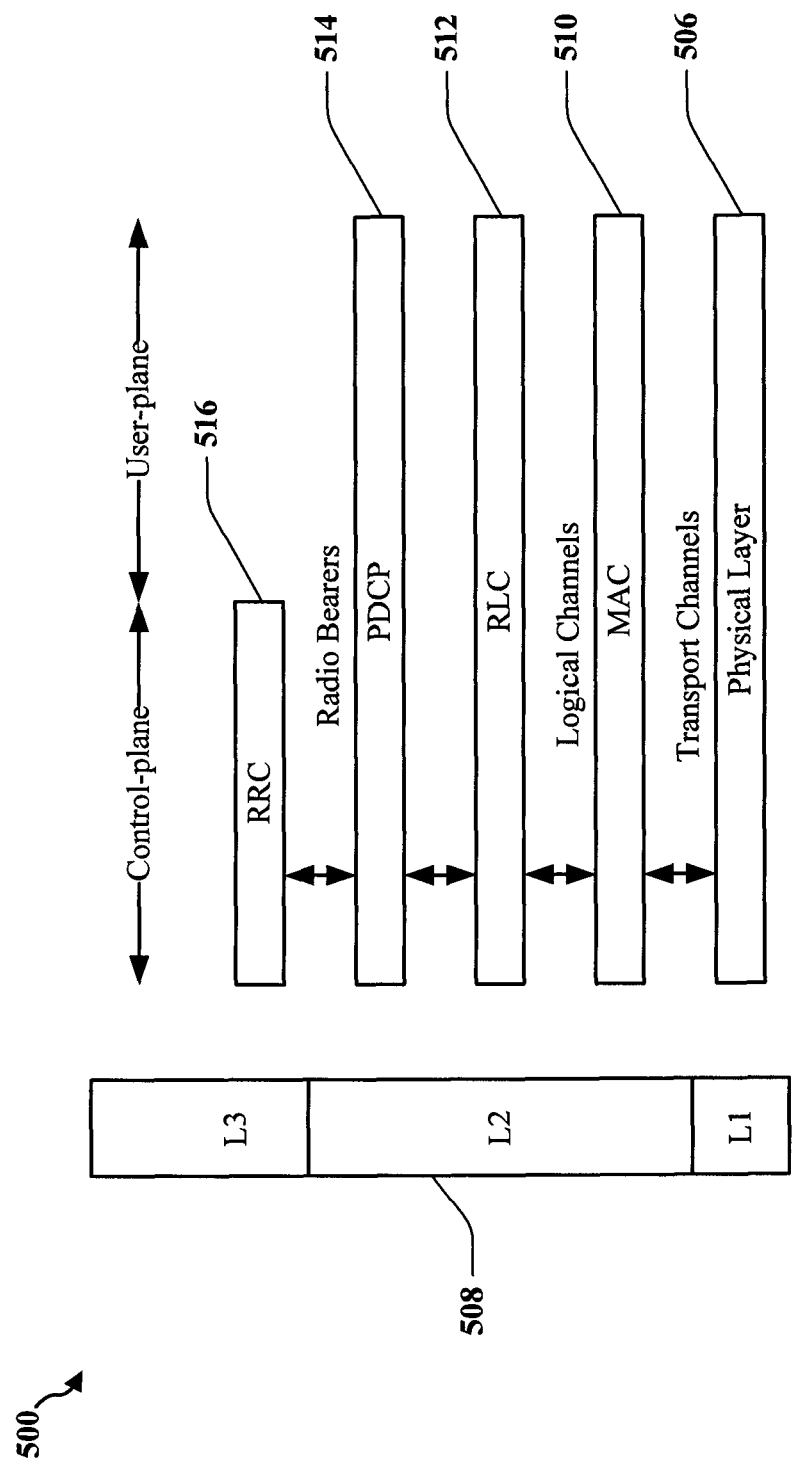
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
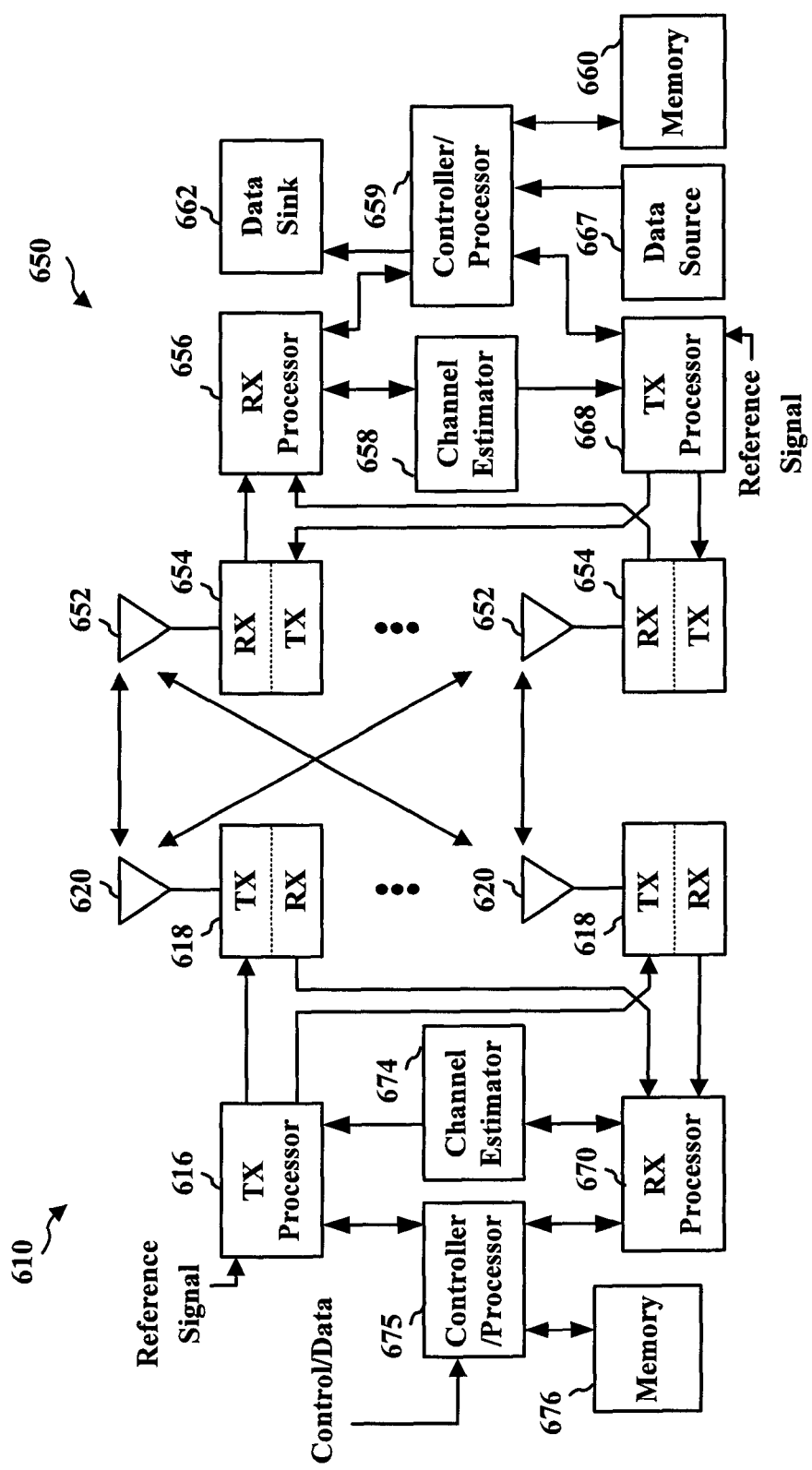
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
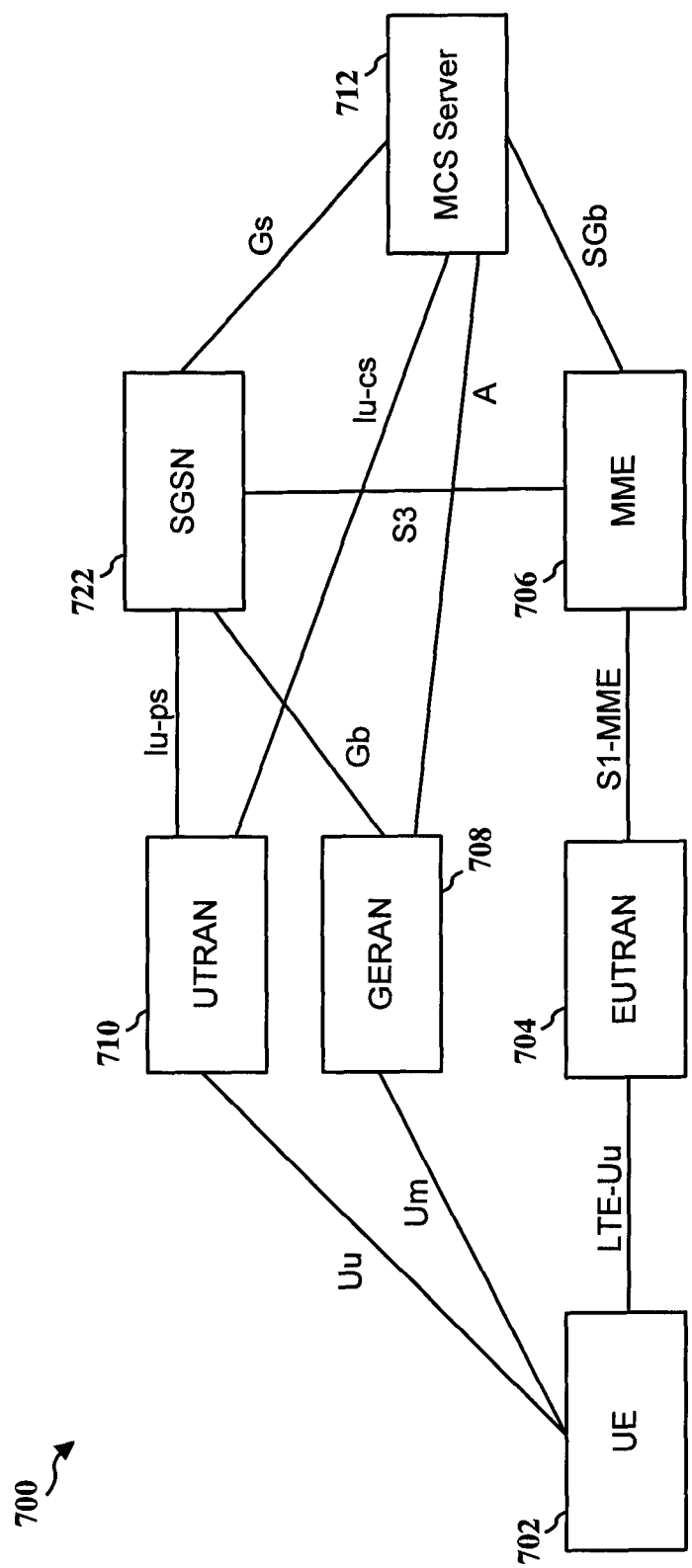
FIG. 7 is a block diagram illustrating inter-radio access technology.

FIG. 7 is a simplified block diagram 700 of a wireless system that includes a number of different radio access networks (RANs) that can register a UE 702. The RANs may include a GSM/Edge radio access network (GERAN) 708, a universal mobile telecommunications system terrestrial radio access network UTRAN) 710 and an evolved universal mobile telecommunications system terrestrial radio access network (E-UTRAN) 704. In the example depicted, a serving general packet radio service (GPRS) support node (SGSN) 722 provides control and management functions for the GERAN 708 and the UTRAN 710. More specifically, the SGSN 722 functions as an interface between the GERAN 708 and the UTRAN 710 and a fixed network for packet switched (PS) services, including in particular, GPRS, which is a packet oriented mobile data service that may be used on GSM. The SGSN 722 performs functions in order to handle packet transmissions to and from the UE 702. For each UE 702, the SGSN stores subscription and location information, including the cell or the routing area (RA) where the UE is registered. A mobility management entity (MME) 706 provides control and management for E-UTRAN 704. A mobile switching centre (MSC) 712 may controls network switching elements. For the purposes of this description, GSM and GERAN and GSM/Edge are used interchangeably, E-UTRAN and LTE are used interchangeably and UTRAN and UMTS are used interchangeably.

Figure 8:
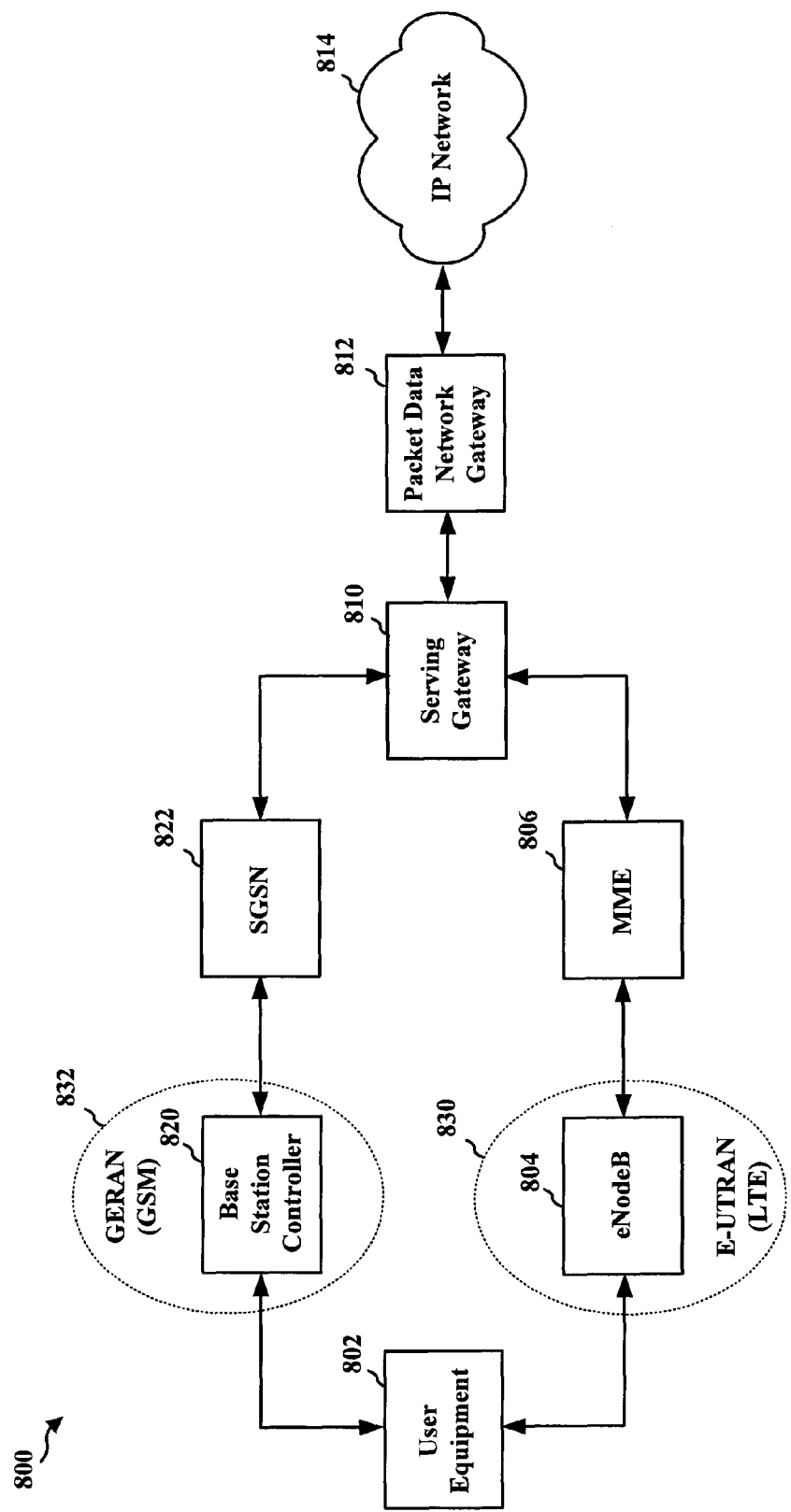
FIG. 8 is a timing diagram illustrating inter-radio access technology.

FIG. 8 depicts a simplified example of a UE 802 located within the coverage of multiple cells that use different frequencies and/or different radio access technologies (RATs) in a radio access network (RAN) to access a core network that provides mobility management, session management, transport for Internet Protocol packet services (e.g. through packet data network gateway 812 which is coupled to an IP network 814), and other services. A RAN may comprise ground-based infrastructure required for delivery of communication between UE 802 and the core network. In LTE, the RAN may comprise one or more eNBs 804. RATs may be based on UMTS, TD-SCDMA, GSM, CDMA2000 and WiMAX.

A UE 802 may perform a mobility procedure that results in the UE selecting from a source cell to a target cell. For example, a UE 802 currently on an E-UTRAN source cell 830 may perform a mobility procedure to select to a GERAN target cell 832. In LTE connected mode, UE mobility is controlled/initiated by a network. For example, the network may send a handover, or CCO or redirection command to the UE 802 for the UE to move to the target cell 832. In the case of a radio link failure (RLF), when a UE 802 experiences a RLF and is unable to locate any LTE cell to connect, the UE may select a cell of another RAT. As another example, a UE 802 currently on a GERAN source cell 832 may perform a mobility procedure to select to an E-UTRAN target cell 830. The mobility procedure may include deselecting from the source cell to camp on the target cell, identifying characteristics of the target cell, establishing a connection on the target cell, receiving a grant on the target cell, and initiating a location update.

A UE 802 may autonomously select a frequency and a RAT to camp on based on a priority list. This priority list may include a set of frequencies, a RAT associated with each frequency, and a priority of each frequency. For example, the priority list may include three frequencies X, Y and Z. Frequency X may be used for a first RAT, such as LTE, and may have the highest priority, frequency Y may be used for a second RAT, such as GSM, and may have the lowest priority, and frequency Z may be used for a third RAT, such as W-CDMA, and may have medium priority. In general, the priority list may include any number of frequencies for any set of RATs and may be specific for the UE location. A UE 702 may be configured to prefer LTE, when available, by defining the priority list with LTE frequencies at the highest priority and with frequencies for other RATs at lower priorities.

In one example, the UE 802 may be able to receive packet-switched (PS) data services from an LTE network and may camp on the LTE network while in the idle mode. The UE 802 may attempt to transfer to another wireless network of another RAT. For example, the UE 802 may initiate a circuit-switched (CS) fallback to initiate or receive voice calls. CS fallback may be accomplished by an inter-RAT redirection or handover executed by the UE 802. For example, the UE 802 may reselect a RAT that supports voice service, such as 1×RTT, W-CDMA, GSM, or other RAT. The UE 802 may transfer from an LTE network to another network if LTE service is lost, particularly when UE 702 physically moves through a coverage area of a communication system.

Mobility management (MM) functions may be provided to support UE 802 mobility, including for example non-access stratum (NAS) signaling and security, signaling between core network nodes for mobility between 3GPP access networks, packet data network gateway (P-GW) 812 and serving gateway (S-GW) 810 selection, and SGSN 822 selection for handovers, and roaming and authentication. A UE 802 may have valid MM parameters from a SGSN 822 and a MME 806, and/or another control node which processes the signaling between the UE 802 and the core network. The MME 806 may provide a visitor location register (VLR) for an EPS. For example, a "Temporary Identity used in Next update" (TIN) may be a parameter of an MM context of the UE 802, which can identify the identity of the UE used in a next routing area update (RAU) request, tracking area update (TAU) request or attach request message.

An idle state signaling reduction (ISR) function may provide a mechanism to limit signaling during inter-RAT cell reselection in idle mode. ISR may be used for E-UTRAN UEs 802 that support GSM/EDGE RAN (GERAN) and/or UTRAN. ISR may be used to limit signaling during inter-RAT cell reselection in idle mode by reducing the frequency of TAU and RAU procedures caused by UEs 802 reselecting between E-UTRAN and GERAN/UTRAN.

A cell update may take place when UE 802 enters a new cell inside the current routing area (RA), and when the UE 802 is in a ready state. If the RA has changed, an RAU may be executed instead of a cell update. A cell update may comprise an uplink logical link control (LLC) protocol data unit (PDU) that includes a temporary logical link identity (TLLI) associated with UE 802. A cell notification may comprise a NULL LLC PDU that includes the TLLI associated with UE 802. When a cell update or cell notification is received, the SGSN 822 may send downlink LLC through the new cell.

ISR may be activated by core network nodes after a UE 802 has registered at least once on each of two networks or two cells. The two networks may use different RATs. For example, a UE 806 that is located near the boundary between a GSM network 832 and an LTE network 830 may move between the networks multiple times. In order to preserve battery power and to reduce the network traffic created by UE 802 transmitting multiple TAU and/or RAU requests, the corresponding MME 806 and SGSN 822 may agree to activate ISR on the UE 802. When ISR is activated, the UE 802 typically refrains from transmitting TAU and RAU requests. Accordingly, attempts to locate the UE 802 in the network, such as for paging, are directed to the MME 806 and SGSN 822 in which the UE 802 has registered.

ISR activation state may be explicitly signaled to the UE 802 in RAU and TAU accept messages. The TIN may provide information that identifies the status of ISR activation in the UE 802. The core network node may cause ISR to be deactivated in the UE 802 by using normal update signaling without setting an "ISR Activated" flag or parameter.

In some circumstances, unsynchronized state information may be present in the UE 802, MME 806 and/or SGSN 822. Such circumstances may cause a UE 802 to deactivate the ISR locally. The UE 802 may deactivate ISR locally by setting the UE's TIN to the temporary identity of the currently used RAT. The UE 802 may deactivate ISR locally by setting its TIN to the temporary identity of a RAT that is still available to the UE 802 after a RAT-specific "Deactivate ISR timer" expires, because the coverage of that RAT is lost or when the RAT is no more selected by the UE.

The network may cause the UE 802 to transfer to another network. For example, a first network may redirect the UE 802 to a second network from a first network. During redirection the UE 802 camps on the second network, and monitors the second network to obtain signaling and other information necessary for connection, before establishing a connection. The first network may also provide for a handover between first and second networks, whereby a source network entity such as MME 806 or SGSN 822 obtains resources in the second network such that UE 802 can select from a connected state in the first network to a connected state in the second network.

The first network may instruct a UE 802 to transfer to the second network using a cell change order (CCO). In one example, the CCO comprises a message from an E-UTRAN eNodeB 804 when the UE 802 is in a connected mode, and the message may instruct the UE 802 to move to a GERAN 832. The message may include information facilitating access to a target cell and/or enabling connection establishment in the target cell. For example, when UE 802 is instructed to transfer from LTE to a GSM cell, the LTE network may provide the UE 802 with target cell information that obviates the need for the UE to collect such information after camping on the GSM cell 832. The CCO may enable PS connected-mode mobility between GERAN ready-mode and another RAN, such as GERAN 708, UTRAN 710, E-UTRAN 704, etc. The source RAN may select a target cell for the UE 702 to reselect, but the source RAN typically does not reserve resources for the UE 702 in the target cell.

The source cell, in which the UE 702 receives the CCO, may maintain context associated with the UE for a predetermined period of time after sending the CCO. Upon successful completion of the CCO, the UE 702 may be connected through the target cell and the context maintained by the source cell can be released. The context may also be released after expiration of a guard timer that is initiated when the CCO is sent to the UE 702. In some instances, the CCO may fail and the UE 702 may return to the source cell. If the context for UE 702 remains available at the source cell, then the connection of the UE 702 to the source cell may be restored. The CCO may fail when the target cell refrains from granting resources to the UE 702, or a connection is not established for other reasons. Certain networks require that the CCO is considered to have failed if no grant has been made to the UE 702 within the predetermined time period set when the CCO is sent.

A CCO may be deemed to be complete after the UE 702 has received a grant to transmit one or more data packets. A CCO may be deemed to be complete for GERAN/UTRAN/E-UTRAN transition to GERAN if the UE 702 has performed an access and has successfully completed contention resolution in the new cell (target cell), or if a GPRS mobility management (GMM) READY timer terminates or stops running during the execution of the procedure. A CCO may be deemed to be complete for GERAN to UTRAN/E-UTRAN transition if an "RRC Connection Setup" message is received.

A CCO may be considered incomplete if the UE 702 fails to receive an uplink grant. This may happen when the UE 702 has no data for transmission (transmit buffers are empty) and when ISR is active for a UE 702 immediately after a move between cells. When the UE 702 has no data for transmission, it typically does not request bandwidth for data transmission and consequently does not receive a grant. When ISR is active, the UE 702 may refrain from sending cell updates, TAU requests and/or RAU requests, which otherwise may have triggered a grant of uplink resources. Consequently, the UE 702 may be forced to return to the source cell due to signaling inactivity.

In certain aspects, the UE 702 may be configured to deactivate ISR locally upon receiving a CCO. Local ISR deactivation typically comprises setting or clearing a flag. The state of the flag may be used by the UE 702 to determine whether TAU or RAU requests can be sent by the UE 702. Where a CCO relates to an intra-GERAN intra-RA move, the UE 702 may send a cell update or cell notification to SGSN. The UE 702 typically begins transmission of cell update requests, TAU requests or RAU requests after the UE 702 autonomously deactivates ISR and may transmit a channel request and may receive a grant of resources for use in sending the update request. The channel request may comprise a packet channel request. The receipt of a grant may enable a determination of a successful completion of the CCO.

In certain aspects, the UE 702 may be configured to ignore ISR activation state when a CCO is received, and the UE 702 may initiate a location management procedure in the target cell without deactivating ISR at the UE 702. The location management procedure may be initiated, for example, when the UE 702 transmits an RAU request, a TAU request or a cell update request. The use of an update procedure to complete the CCO, whether ISR is active or inactive at the time CCO is received, may cause release of resources associated with UE 702 and may cause an update of configuration information maintained by S-GW 810, or maintained by another network gateway or network entity. If the S-GW 810 configuration is not updated, then two active user plane paths may be defined for the UE 702, one in the source cell and the other in the target cell.

In certain embodiments, the UE 702 may be configured to generate data for transmission after a CCO has been received when ISR is activated and no data is queued for transmission. The data generated for transmission on the packet network may comprise a null LLC PDU if, for example, the second network is GERAN. The generated data may comprise a network status inquiry, a broadcast message, a previously transmitted packet of data or an acknowledgement of data received. In one example, the UE 702 may generate an Internet control message protocol (ICMP) echo request (i.e. a Ping) to a known Internet address. In another example, the UE 702 may generate a domain name service request. These Internet requests may be configured to produce minimal overhead on the network. Network requests may be generated that are expected to produce no response. The UE 702 may transmit the generated data after requesting and receiving a grant of resources from the target network. The receipt of a grant enables a determination of a successful completion of the CCO.

When a CCO instructing an E-UTRAN 704 to GERAN 708 move is received while ISR is active, the UE 702 may send RAU or cell update in the target cell to complete the CCO and cause the source eNB 204 to release the radio resource and UE context.

Where a CCO relates to a UTRAN 710 to GERAN 708 intra-RA move, the UE 702 may perform a routing area update (RAU).

In certain embodiments, UE 702 may locally deactivate ISR and/or perform TAU/RAU when a CCO relates to a move between GERAN 708 and E-UTRAN 704, and when ISR is active. In certain embodiments, UE 702 may locally deactivate ISR and/or perform TAU in cell reselection from GERAN packet transfer mode to E-UTRAN. In certain embodiments, UE 702 may perform a cell update when a CCO relates to a move between E-UTRAN to GERAN, and when ISR is active.

In some embodiments, the procedures described herein may be performed for reselection, whereby the UE 702 may generate a local reselection command. For example, the UE 702 may determine that a higher priority RAT has become available and creates an internal command that causes the UE 702 to initiate reselection.

Figure 9:
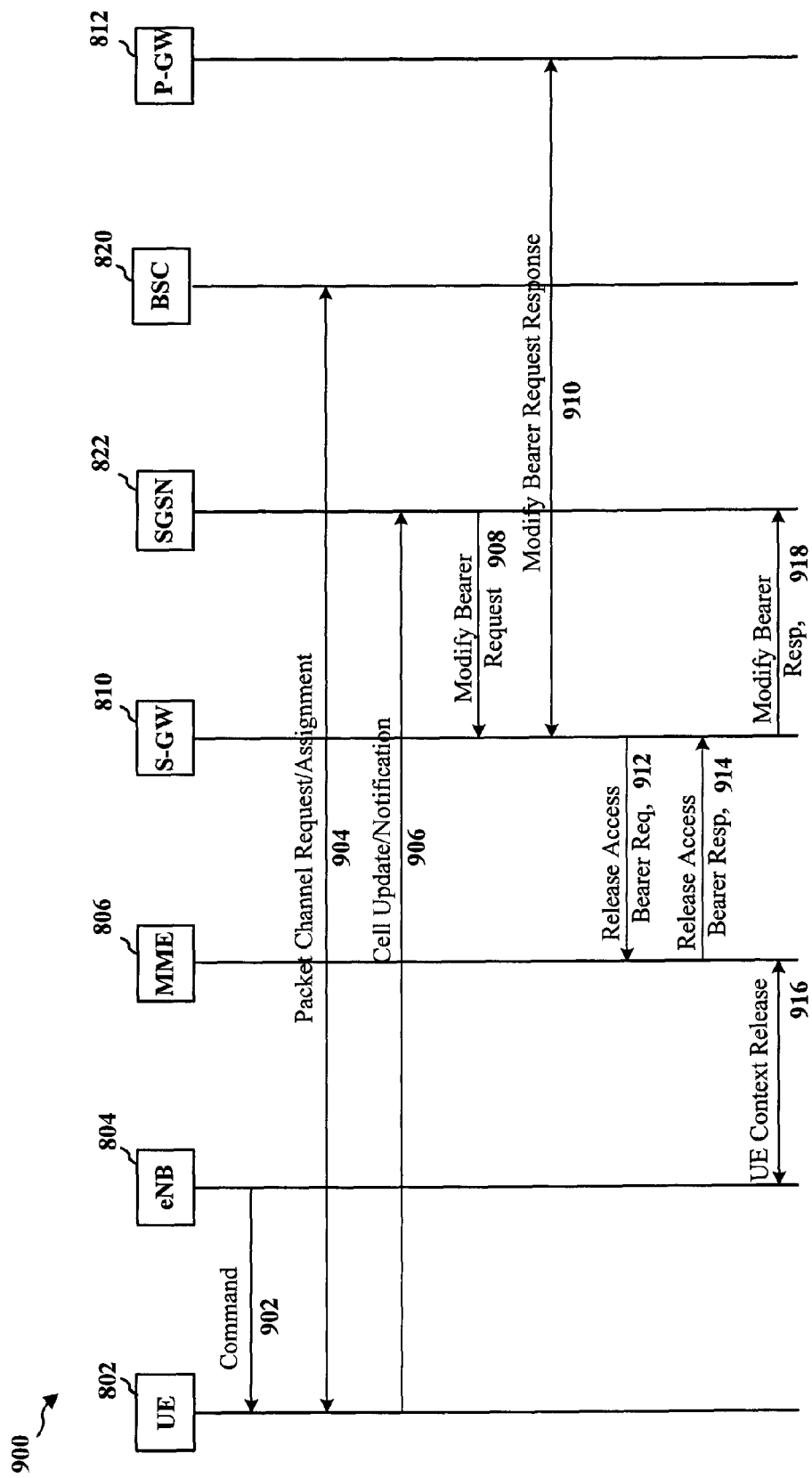
FIG. 9 is a timing diagram illustrating inter-radio access technology.

FIG. 9 is a call flow diagram 900 relating to an example of a location management procedure involving a move of UE 702 from LTE to GSM. The call flow diagram 900 illustrates communications between network entities when cell update request is used to cause completion of a CCO. UE 802 receives a mobility command 902 and initiates a channel request 904 to base station controller 820 after moving to the GSM network. As previously noted, UE 802 may locally deactivate ISR in order to trigger an update message and to thereby receive a grant of uplink resources. Alternatively, the UE 802 may generate user plane or control signaling without deactivating ISR. Upon receiving a grant at 904, UE 802 may send a cell update request or notification 906 to SGSN 822. The SGSN 822 and serving gateway (S-GW) 810 may then communicate, whereby the SGSN 822 sends a request 908 for bearer modification. The S-GW 810 communicates 910 with the packet gateway (P-GW) 812 to modify the bearer as requested by SGSN 722. S-GW 810 requests release 912 by MME 806, which responds at 914. S-GW 810 may then respond 918 to SGSN 722. MME 806 may then cause release of context for UE 802 at eNB 804, having received confirmation that the CCO was completed.

Figure 10:
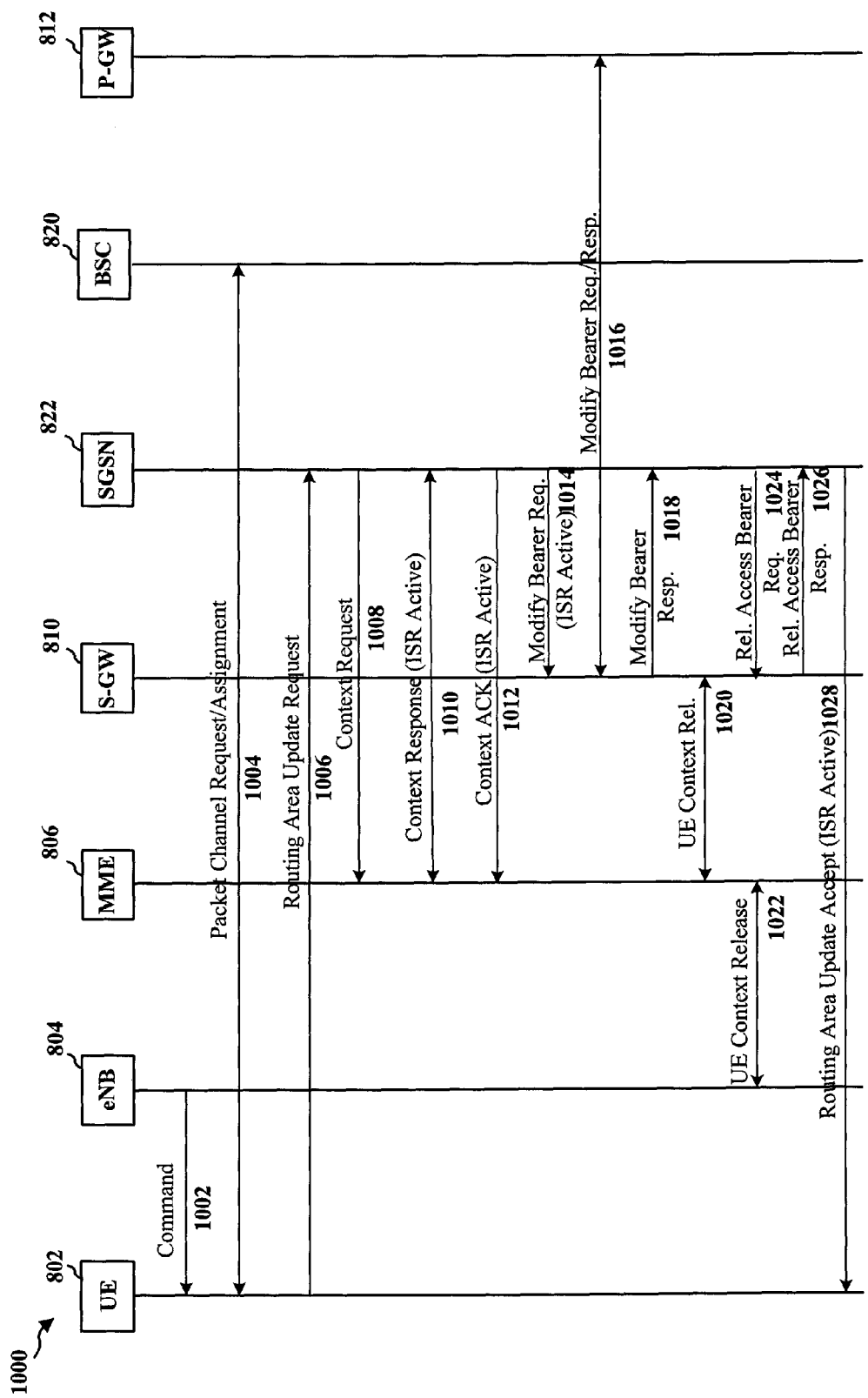

FIG. 10 is a call flow diagram 1000 of a location management procedure related to an example of a move of UE 802 from LTE to GSM. Call flow diagram 1000 illustrates communications between network entities when routing area update request is used to cause completion of a CCO. UE 802 receives a mobility command 1002 and initiates a channel request 1004 to base station controller 820 after moving to the GSM network. At this point, absent other data to send, UE 802 may locally deactivate ISR and generate an RAU message, or it may add other data to its transmit buffer without changing ISR state to trigger an uplink grant. Upon receiving a grant at 1004, UE 802 may send an RAU request 1006 to the SGSN 822. The SGSN 822 and the MME 806 may then communicate, whereby the SGSN sends a context request 1008. A context response 1010 and acknowledgement 1012 follow. The SGSN 822 may then request 1014 that the S-GW 810 issue a modify bearer request, which is then communicated 1016 to the P-GW 812. The S-GW 810 may respond 1018 to the SGSN 822. The S-GW 810 exchanges information 1020 with the MME 806, which may respond by causing release 1022 of context for UE 802 at eNB 804. The SGSN 822 and S-GW 810 may send a release access bearer request 1024 to the S-GW 810 which may respond at 1026. Finally, the SGSN 822 may send an acceptance 1028 of the RAU request to the UE 802.

A reselection of UE 802 from a source cell to a target cell may be attempted as part of a CS fallback procedure. In one example, the source cell 830 may comprise an LTE network, while the target cell 832 may comprise a GSM network. In some embodiments, the CS fallback move may be initiated after a receipt at the UE 802 of a CCO. The UE 802 may attempt to move to a target network that is CS-capable network but may not complete the CCO, or the attempted move may fail because, for example, the UE 802 may not be able to obtain a grant from the base station in the target cell. The UE 802 may reselect the same or another CS-capable cell rather than return to the source network. In some embodiments, the UE 802 may perform a location management procedure different form the procedures illustrated in FIGS. 9 and 10 for CS fallback operations. For example, after receiving a CCO instructing a CS fallback, UE 802 may send a channel request to a base station controller (BSC) 820, upon arrival on the GERAN 832, to acquire a low layer transmission grant. The UE 802 may then send one or more of a connection management service request (CM Service Request), a paging response, and a location update to the MSC server 812.

UE mobility between GERAN and LTE when ISR is active may be triggered by a radio frequency failure (RLF). For example, when a UE suffers RLF in LTE and cannot connect to any LTE cells, the UE may select a GSM cell. A RAU procedure is useful for target SGSN to notify LTE to release the resource in LTE (eNB and MME). If ISR is active and RA is not changed, the UE should locally deactivate ISR to trigger the RAU.

An alternative solution of deactivation ISR is to ignore ISR. For example, when a UE moves from one RAT to second RAT due to CCO, RLF or connected mode cell reselection, the UE may perform RAU/TAU in target RAT regardless of ISR state. As previously noted, locally deactivation is achieved by changing "TIN" parameter (refer to ISR section of 23.401) of UE from "RAT specific TMSI" to "GUTI" or "P-TMSI". Ignoring ISR means the value of TIN is not changed by the UE.

Figure 11:
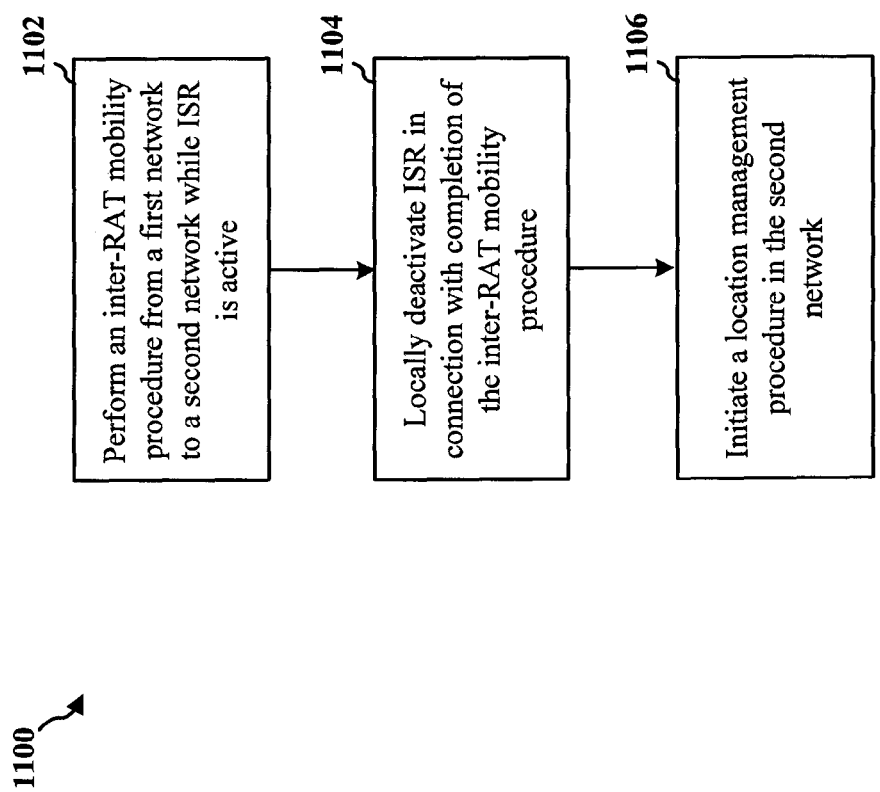
FIG. 11 is a flow chart of a method of wireless communication.

FIG. 11 is a flow chart 1100 of a method of wireless communication. The method may be performed by a UE 802. At step 1102, the UE 802 performs an inter-RAT mobility procedure from a first network to a second network while ISR is active. At step 1104, the UE 802 locally deactivates ISR in connection with completion of the inter-RAT mobility procedure. Local deactivation of ISR may be performed when it is determined that the routing area (RA) or TAI list is the same as the registered RA or TAI list. At step 1106, the UE 802 initiates a location management procedure in the second network.

With respect to performance of an inter-RAT mobility procedure (step 1102), such performance may be initiated by the network, in some cases, or by the UE itself, in other cases. When network initiated, the inter-RAT mobility procedure is performed by the UE in response to a mobility command, e.g., CCO, received by the UE from the first network. For example, when the first network is an LTE network and the second network is a GSM network, the UE may receive the CCO while it is in a connected mode of the LTE network. The UE performs the mobility procedure from the LTE network to the GSM network in response to the CCO.

Also, when the first network is a GSM network and the second network is an LTE network, the UE may receive the CCO while in a connected state of the GSM network. The UE performs the mobility procedure from the GSM network to the LTE network in response to the CCO. In this scenario, with respect to the initiation of the location management procedure (step 1106), the UE initiates the location management procedure by sending a tracking area update (TAU) in the LTE network in response to locally deactivating ISR (step 1104).

When UE initiated, the inter-RAT mobility procedure may be performed in response to mobility conditions of the first network detected by the UE when the UE is in a connected mode with respect to the first network. The UE may detect a mobility condition of the first network that warrants a network reselection by the UE. Such conditions may be based on quality or performance measurements of the first network that indicate the second network may be a better network for the UE. In one possible scenario, when the first network is a GSM network and the second network is an LTE network, the UE may detect a mobility condition with respect to the GSM network. The UE may initiate a cell reselection procedure in response to detecting the mobility condition.

With respect to initiation of a location management procedure (step 1106), the UE may initiate such procedure by sending a location based update message, such as a RAU or a TAU. The sending of an update message may be triggered by the local deactivation of ISR. Initiating the location management procedure in the second network may facilitate an early release of resources associated with the UE in the first network.

Examples implementations of the method of FIG. 11 follow. In one implementation, the first network is a GERAN and the second network is an E-UTRAN. Under this scenario, the inter-RAT mobility procedure (step 1102) may be performed in response to a CCO received from the first network, and the UE may initiate a location management procedure (step 1106) by sending a TAU request. Under the same scenario, if the UE is in a packet transfer mode (PTM) mode on the GERAN, the inter-RAT mobility procedure may be performed in response to a cell reselection locally initiated by the UE. Once again, the UE initiates a location management procedure by sending a TAU request.

In another implementation, the first network is an E-UTRAN and the second network is a GERAN. Under this scenario, the inter-RAT mobility procedure (step 1102) is performed in response to a CCO received from the first network that is not for CS fallback. The UE may be in connected mode with the E-UTRAN. The UE may initiate a location management procedure (step 1106) by sending a RAU request after locally deactivating the ISR (step 1104). This may occur when the mobility procedure from the E-TRAN to the GERAN results in a change in RA for the UE. The UE may also initiate a location management procedure (step 1106) by sending a cell update message or a cell notification. This occurs when the mobility procedure from the E-TRAN to the GERAN results in the UE entering a new cell inside its current routing area (RA), and when the UE is in a ready state.

In another scenario, where the first network is an E-UTRAN and the second network is a GERAN, the mobility procedure may be initiated for circuit-switched (CS) fallback. Under this scenario, the UE may determine whether the move from the first network to the second network failed. If the move did fail, the UE may autonomously reselect a CS-capable RAT. The UE may also acquire a low layer transmission grant in the GERAN, and send one or more of a connection management service request, a paging response, and a location update to a mobile switching center.

In yet another scenario, where the first network is an E-UTRAN and the second network is a GERAN, the UE may send a null packet (or any packet) to the GERAN to meet the CCO completion condition if it has no data or signaling to send. Conditions for this action include an active ISR and no change is RA due to the mobility procedure. In this case, the UE may determine whether data is available for transmitting on the GERAN, generate data for transmission on a packet network when no data is determined to be available, and transmit an uplink signal to obtain a grant from a base station of the GERAN for sending the generated data. The signal may be transmitted, for example, by sending a channel request. In this scenario, the UE may initiate the location management procedure by sending an RAU request, a cell update message or a cell notification to a SGSN, or a TAU request to a MME.

Figure 12:
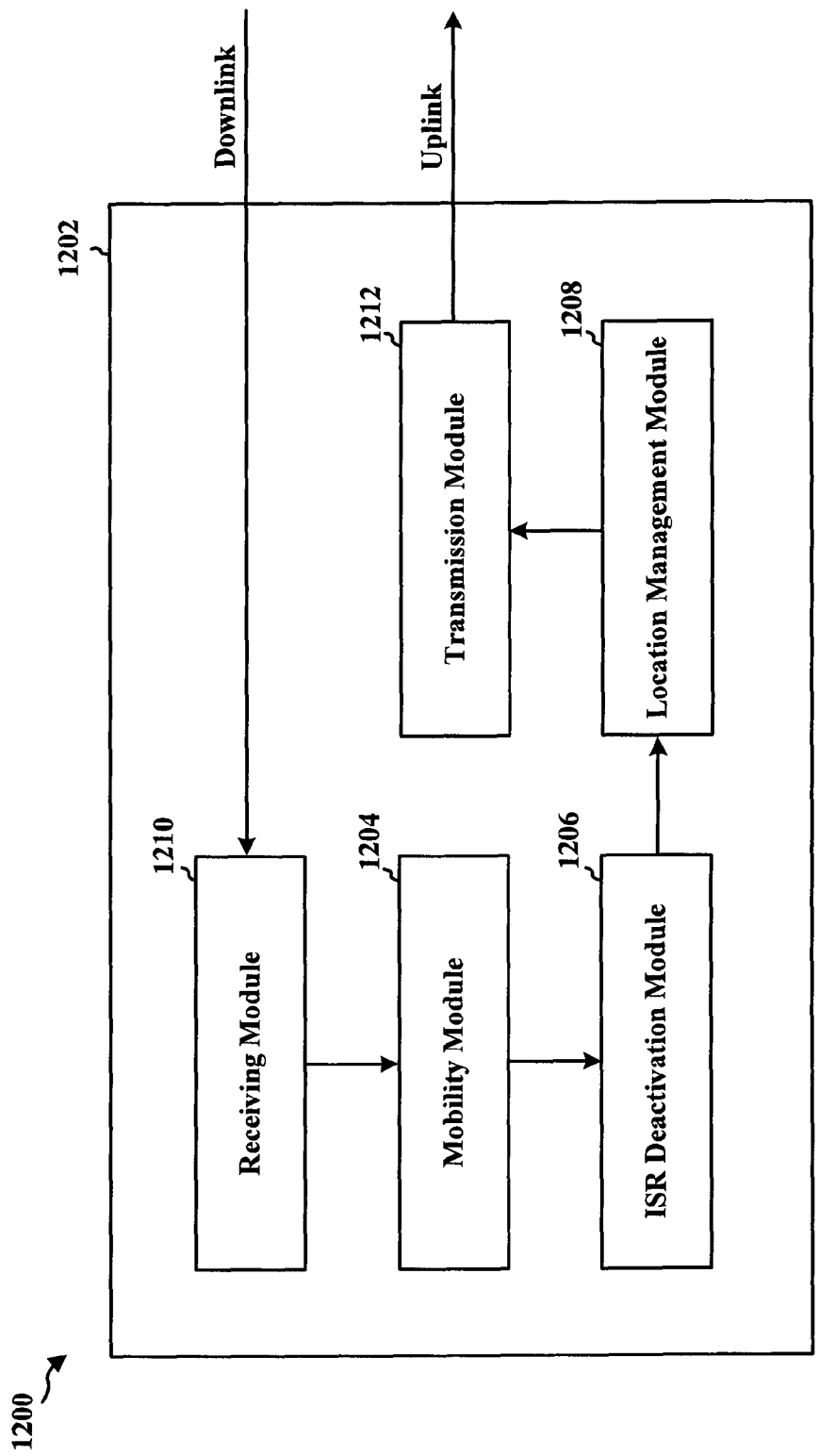
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a UE 702. The apparatus includes a mobility module 1204 that performs an inter-RAT mobility procedure from a first network to a second network while ISR is active, an ISR deactivation module 1206 that locally deactivates ISR in connection with completion of the inter-RAT mobility procedure by the mobility module 1204, and a location management module 1206 that initiates a location management procedure in the second network. The apparatus 1202 also includes a receiving module 1208 that receives signals, such as mobility commands, from a network 1220, and a transmission module 1210 that manages and generates data for transmission. The apparatus 1202 may include additional modules that perform each of the steps of the algorithm in the aforementioned flow chart of FIG. 11. As such, each step in the aforementioned flow chart of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
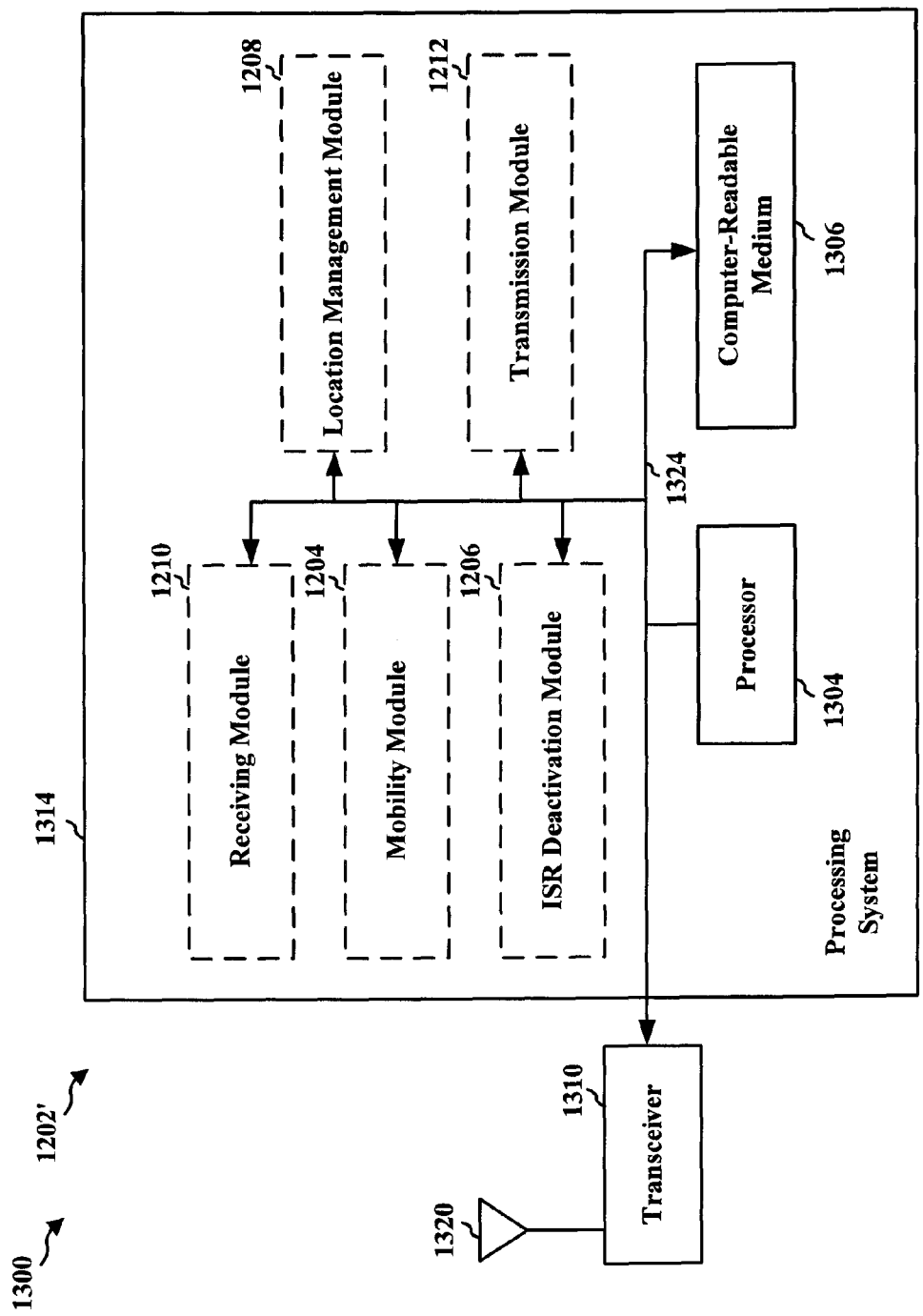
FIG. 13 is a diagram illustrating an example of a hardware implementation for an apparatus employing a processing system.

FIG. 13 is a diagram illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, 1212, and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes at least one of the modules 1204, 1206, 1208, 1210, and 1212. The modules may be software modules running in the processor 1304, resident/stored in the computer readable medium 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 1202/1202' for wireless communication includes means 1204 for performing an inter-RAT mobility procedure from a first network to a second network while ISR is active, means 1206 locally deactivating ISR in connection with completion of the inter-RAT mobility procedure by the mobility means 1204, and means 1208 for initiating a location management procedure in the second network. The apparatus 1202/1202' may also include means 1210 for receiving signals, such a mobility commands, from a network, and means 1212 for managing and generating data for transmission on an uplink.

The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 14:
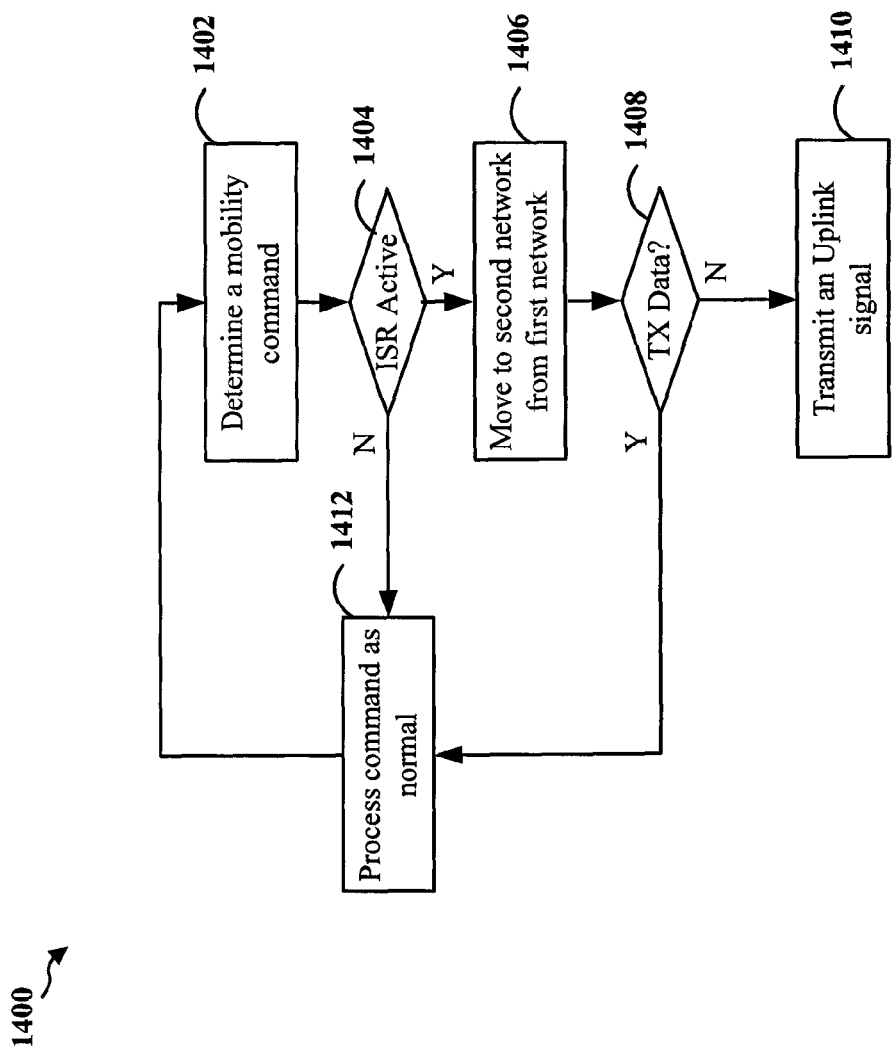
FIG. 14 is a flow chart of a method of wireless communication.

FIG. 14 is a flow chart 1400 of a method of wireless communication. The method may be performed by a UE 702. At step 1402, the UE 702 determines that a mobility procedure is required while ISR is active. In one example, the requirement for a mobility procedure may be based on a requirement to reselect a network for CS fallback. In another example, the requirement for a mobility procedure may be based on receiving a mobility command. The mobility command maybe generated internally or by a network entity. The mobility command may instruct the UE 702 to move from a first network to a second network. For example, the mobility command may include a cell change order and communication parameters to assist UE 702 in accessing a specified target network. The first and second networks may use different RATs.

At step 1404, the UE 702 may determine if ISR is active for the UE 702. If ISR is not active, the UE 702 may proceed normally at step 1412, whereby the UE 702 may send update requests, which may allow completion of the mobility command. If ISR is active, then at step 1406, the UE 702 moves to the second network. This may, for example, involve transition from a connected state on the first network to a connected state on the second network using the communication parameters associated with the mobility command.

At step 1408, the UE 702 optionally determines if data is buffered or queued for transmission from the UE 702. If data is available for transmission, the UE 702 may proceed normally at step 1412, whereby the UE 702 may the data, which may allow completion of the mobility command.

At step 1408, the UE 702 may initiate a location management procedure in the second network. Initiating a location management procedure may include transmitting an uplink signal to request a grant from a base station of the second network. The UE 702 may optionally deactivate ISR autonomously to enable UE 702 to automatically generate and transmit an uplink signal. In some embodiments, the UE 702 may ignore ISR and transmit one or more update requests in the uplink signal upon receiving a CCO. The uplink signal may comprise a cell update request. The uplink signal may comprise a routing area update request.

In one aspect, initiating the location management procedure includes sending an update request comprising one or more of a RAU request, a TAU request, and a cell update request in the uplink signal. The update request may cause a network gateway to release resources allocated to UE 702. In one example, the second network comprises a GERAN and the location management procedure comprises a RAU procedure. In another example, the second network comprises a GERAN and the location management procedure comprises a cell update or a cell notification procedure. In another example, the second network comprises a UTRAN or an E-UTRAN and the location management procedure comprises a TAU procedure.

The first network may employ a RAT that is different from the RAT employed by the second network, and wherein the mobility command comprises a CCO command. In one example, the first network comprises a GERAN and the second network comprises a UTRAN, and the mobility command comprises a CCO. In another example, the first network comprises a GERAN and the second network comprises an E-UTRAN, and the mobility command comprises a locally-generated reselection command.

In some embodiments, the UE 702 generates data for transmission on a packet network and transmits an uplink signal to obtain a grant from a base station of the second network for sending the generated data. Transmitting an uplink signal may comprise sending a channel request. The channel request may comprise a packet channel request. In one example, initiating the location management procedure comprises sending an RAU request or a TAU request through a base station to an SGSN. In another example, initiating the location management procedure comprises sending a cell update message or a cell notification message to an SGSN.

In some embodiments, the uplink signal includes data provided by the UE 702 for transmission on a packet network. The data provided for transmission on a packet network may comprise data previously transmitted on the packet network. The data provided for transmission on a packet network may comprise an acknowledgement previously transmitted on the packet network. The data provided for transmission on a packet network may comprise a network control message.

In some embodiments, the uplink signal comprises a channel request. The channel request may comprise a packet channel request. The mobility command may be determined to be completed when the grant is received.

In some embodiments, the mobility command comprises a CCO command. In some embodiments, the first network comprises a GERAN. The second network may comprise a UTRAN or an E-UTRAN. The second network may comprise a GERAN. In some embodiments, the first network comprises an E-UTRAN and the second network comprises a GERAN.

Figure 15:
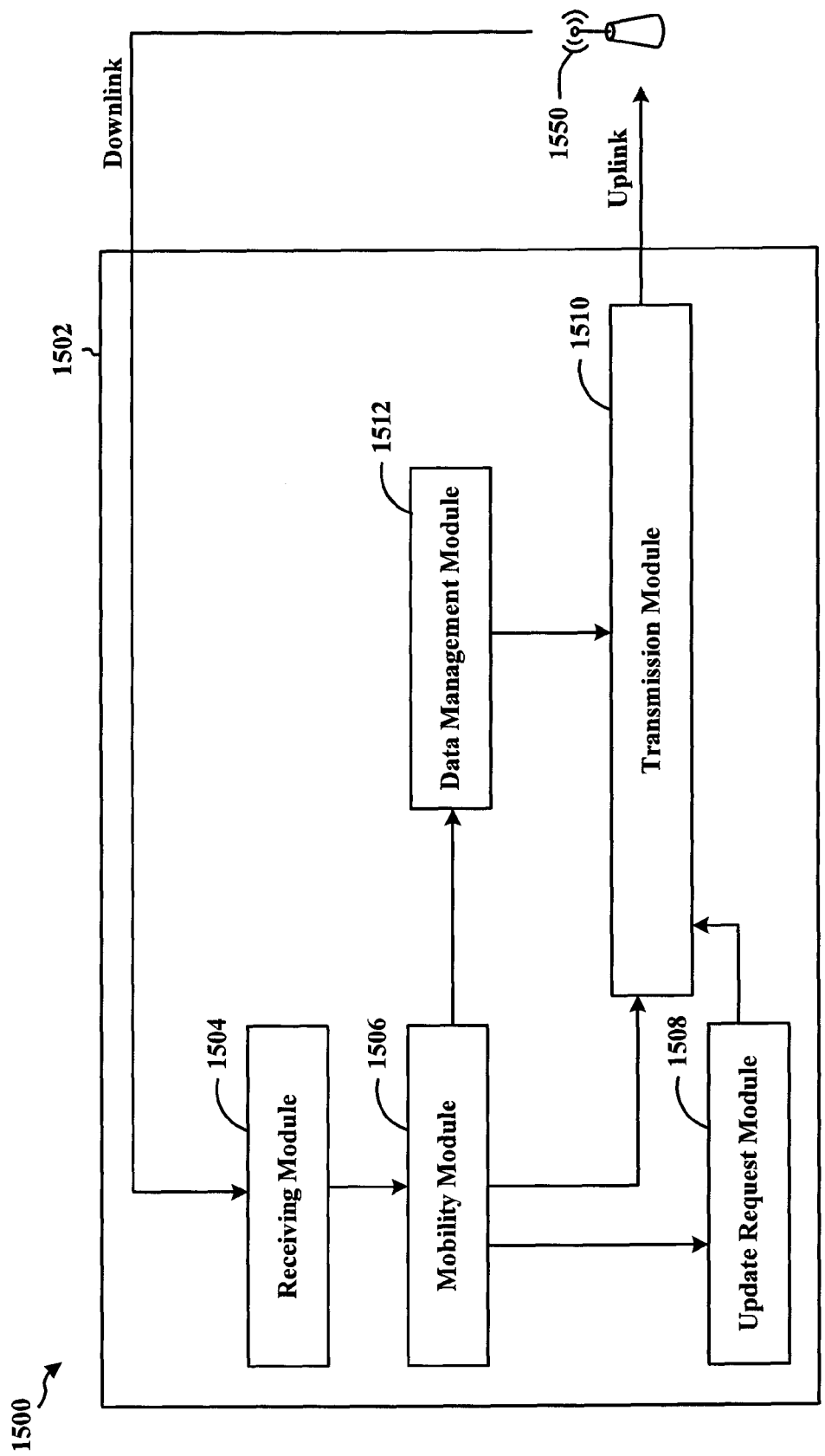
FIG. 15 is a conceptual data flow diagram illustrating the data flow between different modules/means/components in an exemplary apparatus.

FIG. 15 is a conceptual data flow diagram 1500 illustrating the data flow between different modules/means/components in an exemplary apparatus 1502. The apparatus may be a UE 702. The apparatus includes a module 1504 that receives and processes a mobility command, a module 1506 that manages certain aspects of mobility of UE 702, a module 1508 that handles one or more of a cell update request, a RAU request, and a TAU request, a module 1510 that manages uplink transmissions, and a module 1512 that manages and generates data for transmission by transmission module 1510.

The apparatus may include additional modules that perform each of the steps of the algorithm in the aforementioned flow charts of FIG. 14. As such, each step in the aforementioned flow charts of FIG. 14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
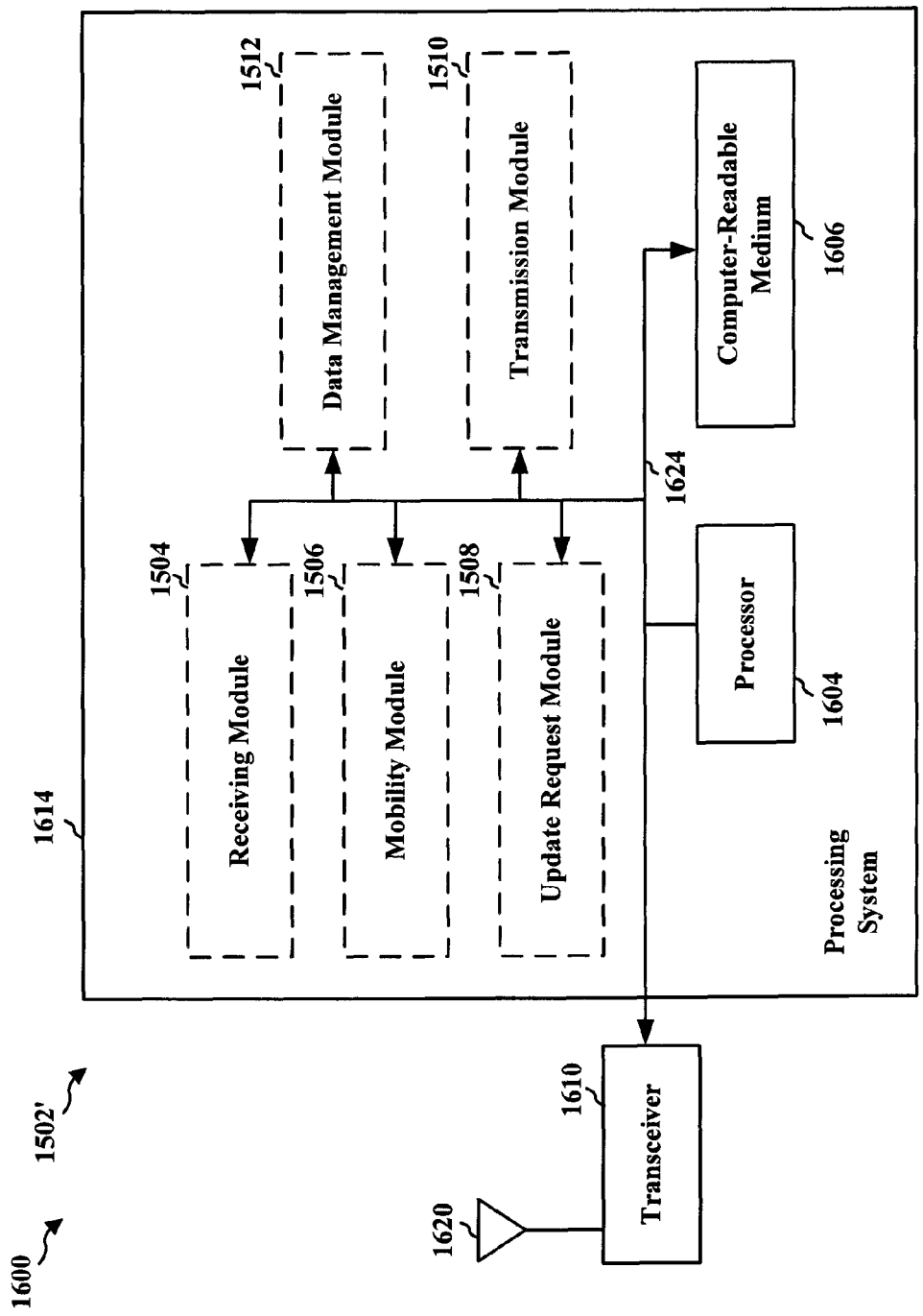
FIG. 16 is a diagram illustrating an example of a hardware implementation for an apparatus employing a processing system.

FIG. 16 is a diagram illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1504, 1506, 1508, 1510, 1512, and the computer-readable medium 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The processing system 1614 includes a processor 1604 coupled to a computer-readable medium 1606. The processor 1604 is responsible for general processing, including the execution of software stored on the computer-readable medium 1606. The software, when executed by the processor 1604, causes the processing system 1614 to perform the various functions described supra for any particular apparatus. The computer-readable medium 1606 may also be used for storing data that is manipulated by the processor 1604 when executing software. The processing system further includes at least one of the modules 1504, 1506, 1508, 1510, and 1512. The modules may be software modules running in the processor 1604, resident/stored in the computer readable medium 1606, one or more hardware modules coupled to the processor 1604, or some combination thereof. The processing system 1614 may be a component of the UE 650 and may include the memory 660 and/or at least one of the TX processor 668, the RX processor 656, and the controller/processor 659.

In one configuration, the apparatus 1502/1202' for wireless communication includes means 1504 for receiving a mobility command while ISR is active, means 1506 for moving from a first network to a second network, means 1508 for managing update requests, means 1512 for determining whether data is available for transmitting on the second network and for generating data for transmission, and means 1510 for transmitting an uplink signal to obtain a grant from a base station of the second network. In some embodiments means 1508 may deactivate ISR locally. Deactivating ISR may enable means 1508 to transmit an uplink signal. The uplink signal may comprise a cell update request. The uplink signal may comprise a RAU update request. The uplink signal may comprise a TAU update request.

In some embodiments, the mobility command comprises a CCO command. The first network may employ a RAT that is different from the RAT employed by the second network. The first network may comprise a GERAN. The second network may comprise a GERAN or a UTRAN or an E-UTRAN. In some embodiments, the first network may comprise an E-UTRAN and the second network may comprise a GERAN.

In some embodiments, means 1510 may provide data for transmission on a packet network. The data provided for transmission on a packet network may comprise data previously transmitted on the packet network. The data provided for transmission on a packet network may comprise an acknowledgement previously transmitted on the packet network. The data provided for transmission on a packet network may comprise a network control message. The uplink signal may comprise a channel request. The channel request may comprise a packet channel request. The mobility command may be determined to be completed when the grant is received.

The aforementioned means may be one or more of the aforementioned modules of the apparatus 1502 and/or the processing system 1614 of the apparatus 1502' configured to perform the functions recited by the aforementioned means. As described supra, the processing system 1614 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
    performing an inter-radio access technology (RAT) mobility procedure from a first network to a second network while idle mode signaling reduction (ISR) is active;
    determining whether the UE has previously registered in a routing or tracking area of the second network;
    locally deactivating ISR in connection with completion of the inter-RAT mobility procedure and based on determining that the UE has previously registered in the routing or tracking area of the second network; and
    initiating a location management procedure in the second network.

2. The method of claim 1, further comprising:
    receiving a mobility command from the first network, and wherein the inter-RAT mobility procedure is performed in response to the mobility command.

3. The method of claim 1, wherein the UE is in a connected mode, and further comprising:
    detecting a mobility condition of the first network; and initiating, by the UE, the inter-RAT mobility procedure in response to detecting the mobility condition.

4. The method of claim 1, wherein initiating the location management procedure comprises sending a location-based update message.

5. The method of claim 4, wherein initiating the location management procedure is triggered by the local deactivation of ISR.

6. The method of claim 1, wherein initiating the location management procedure in the second network facilitates an early release of resources associated with the UE in the first network.

7. The method of claim 1, wherein the inter-RAT mobility procedure is not triggered by a circuit-switched fallback (CSFB) from the first network to the second network.

8. The method of claim 1, wherein the first network comprises an LTE network and the second network comprises a GSM network, the method further comprising:
    receiving a cell change order (CCO) while in a connected mode of the LTE network; and
    performing the mobility procedure from the LTE network to the GSM network in response to the CCO.

9. The method of claim 1, wherein the first network comprises a GSM network and the second network comprises an LTE network, the method further comprising:
    receiving a cell change order (CCO) while in a connected state of the GSM network; and
    performing the mobility procedure from the GSM network to the LTE network in response to the CCO.

10. The method of claim 9, wherein initiating the location management procedure comprises sending a tracking area update (TAU) in the LTE network in response to locally deactivating ISR.

11. The method of claim 9, further comprising:
    detecting a mobility condition with respect to the GSM network; and
    initiating, by the UE, a cell reselection procedure in response to detecting the mobility condition.

12. The method of claim 1, wherein the first network comprises a GSM/Edge radio access network (GERAN) and the second network comprises an evolved universal mobile telecommunications system terrestrial radio access network (E-UTRAN).

13. The method of claim 12, wherein:
    the inter-RAT mobility procedure is performed in response to a cell change order (CCO) received from the first network; and
    initiating a location management procedure comprises sending a tracking area update (TAU) request.

14. The method of claim 12, wherein:
    the UE is connected in a packet transfer mode (PTM) mode on the GERAN;
    the inter-RAT mobility procedure is performed in response to a locally initiated cell reselection; and
    initiating a location management procedure comprises sending a tracking area update (TAU) request.

15. The method of claim 11, wherein:
    the first network comprises an evolved universal mobile telecommunications system terrestrial radio access network (E-UTRAN) and the second network comprises a GSM/Edge radio access network (GERAN); and the inter-RAT mobility procedure is performed in response to a cell change order (CCO) received from the first network that is not for CS fallback.

16. The method of claim 15, wherein the UE is in connected mode with the E-UTRAN.

17. The method of claim 15, wherein initiating a location management procedure further comprises sending a routing area update (RAU) request after deactivating the ISR.

18. The method of claim 15, wherein initiating the location management procedure includes sending a cell update message or a cell notification message.

19. The method of claim 1, wherein:
the first network comprises an evolved universal mobile telecommunications system terrestrial radio access network (E-UTRAN) and the second network comprises a GSM/Edge radio access network (GERAN); and
the mobility procedure is initiated for circuit-switched (CS) fallback.

20. The method of claim 19, further comprising:
determining whether a move from the first network to the second network failed; and
autonomously reselecting a CS-capable RAT when the move is determined to have failed.

21. The method of claim 19, further comprising:
acquiring a low layer transmission grant in the GERAN; and
sending one or more of a connection management service request, a paging response, and a location update to a mobile switching center.

22. The method of claim 1, further comprising:
determining whether data is available for transmitting on the second network;
generating data for transmission on a packet network when no data is determined to be available; and
transmitting an uplink signal to obtain a grant from a base station of the second network for sending the generated data.

23. The method of claim 22, wherein transmitting the uplink signal comprises sending a channel request.

24. The method of claim 22, wherein initiating the location management procedure comprises sending an RAU request to a serving general packet radio service support node (SGSN) or a TAU request to a mobility management entity.

25. The method of claim 22, wherein initiating the location management procedure comprises sending a cell update message or a cell notification message to a SGSN.

26. An apparatus for wireless communication, comprising:
means for performing an inter-radio access technology (RAT) mobility procedure from a first network to a second network while idle mode signaling reduction (ISR) is active;
means for determining whether the UE has previously registered in a routing or tracking area of the second network;
means for locally deactivating ISR in connection with completion of the inter-RAT mobility procedure and based on determining that the UE has previously registered in the routing or tracking area of the second network; and
means for initiating a location management procedure in the second network.

27. The apparatus of claim 26, further comprising:
means for receiving a mobility command from the first network, and
wherein the inter-RAT mobility procedure is performed in response to the mobility command.

28. The apparatus of claim 26, wherein the UE is in a connected mode, and further comprising:
means for detecting a mobility condition of the first network; and
means for initiating, by the UE, the inter-RAT mobility procedure in response to detecting the mobility condition.

29. The apparatus of claim 26, wherein the means for initiating the location management procedure is configured to send a location-based update message.

30. The apparatus of claim 29, wherein the means for initiating the location management procedure is triggered by the local deactivation of ISR.

31. The apparatus of claim 26, wherein the means for initiating the location management procedure in the second network facilitates an early release of resources associated with the UE in the first network.

32. The apparatus of claim 26, wherein the means for performing the inter-RAT mobility procedure is not triggered by a circuit-switched fallback (CSFB) from the first network to the second network.

33. The apparatus of claim 26, wherein the first network comprises an LTE network and the second network comprises a GSM network, the apparatus further comprising:
means for receiving a cell change order (CCO) while in a connected mode of the LTE network; and
means for performing the mobility procedure from the LTE network to the GSM network in response to the CCO.

34. The apparatus of claim 26, wherein the first network comprises a GSM network and the second network comprises an LTE network, the apparatus further comprising:
means for receiving a cell change order (CCO) while in a connected state of the GSM network; and
means for performing the mobility procedure from the GSM network to the LTE network in response to the CCO.

35. The apparatus of claim 34, wherein the means for initiating the location management procedure is configured to send a tracking area update (TAU) in the LTE network in response to the ISR being locally deactivated.

36. The apparatus of claim 34, further comprising:
means for detecting a mobility condition with respect to the GSM network; and
means for initiating, by the UE, a cell reselection procedure in response to detecting the mobility condition.

37. The apparatus of claim 26, wherein the first network comprises a GSM/Edge radio access network (GERAN) and the second network comprises an evolved universal mobile telecommunications system terrestrial radio access network (E-UTRAN).

38. The apparatus of claim 37, wherein:
the means for performing an inter-RAT mobility procedure is configured to perform in response to a cell change order (CCO) received from the first network; and
the means for initiating a location management procedure is configured to send a tracking area update (TAU) request.

39. The apparatus of claim 37, wherein:
the UE is configured to connect in a packet transfer mode (PTM) mode on the GERAN;

the means for performing an inter-RAT mobility procedure is configured to perform in response to a locally initiated cell reselection; and the means for initiating a location management procedure is configured to send a tracking area update (TAU) request.

40. The apparatus of claim 36, wherein:

the first network comprises an evolved universal mobile telecommunications system terrestrial radio access network (E-UTRAN) and the second network comprises a GSM/Edge radio access network (GERAN); and the means for performing an inter-RAT mobility procedure is configured to perform in response to a cell change order (CCO) received from the first network that is not for CS fallback.

41. The apparatus of claim 40, wherein the UE is configurable to be in connected mode with the E-UTRAN.

42. The apparatus of claim 40, wherein the means for initiating a location management procedure is configured to send a routing area update (RAU) request after deactivation of the ISR.

43. The apparatus of claim 40, wherein the means for initiating the location management procedure is configured to send a cell update message or a cell notification message.

44. The apparatus of claim 26, wherein:

the first network comprises an evolved universal mobile telecommunications system terrestrial radio access network (E-UTRAN) and the second network comprises a GSM/Edge radio access network (GERAN); and the mobility procedure is initiated for circuit-switched (CS) fallback.

45. The apparatus of claim 44, further comprising:

means for determining whether a move from the first network to the second network failed; and means for autonomously reselecting a CS-capable RAT when the move is determined to have failed.

46. The apparatus of claim 44, further comprising:

means for acquiring a low layer transmission grant in the GERAN; and means for sending one or more of a connection management service request, a paging response, and a location update to a mobile switching center.

47. The apparatus of claim 26, further comprising:

means for determining whether data is available for transmitting on the second network;

means for generating data for transmission on a packet network when no data is determined to be available; and means for transmitting an uplink signal to obtain a grant from a base station of the second network for sending the generated data.

48. The apparatus of claim 47, wherein the means for transmitting the uplink signal is configured to send a channel request.

49. The apparatus of claim 47, wherein the means for initiating the location management procedure is configured to send an RAU request to a serving general packet radio service support node (SGSN) or a TAU request to a mobility management entity.

50. The apparatus of claim 47, wherein the means for initiating the location management procedure is configured to send a cell update message or a cell notification message to a SGSN.

51. An apparatus for wireless communication, comprising:

a memory; and at least one processor coupled to the memory and configured to:

perform an inter-radio access technology (RAT) mobility procedure from a first network to a second network while idle mode signaling reduction (ISR) is active;

determine whether the UE has previously registered in a routing or tracking area of the second network;

locally deactivate ISR in connection with completion of the inter-RAT mobility procedure and based on determining that the UE has previously registered in the routing or tracking area of the second network; and initiate a location management procedure in the second network.

52. A non-transitory computer-readable medium storing computer executable code for wireless communication, comprising code for:

performing an inter-radio access technology (RAT) mobility procedure from a first network to a second network while idle mode signaling reduction (ISR) is active;

determining whether the UE has previously registered in a routing or tracking area of the second network;

locally deactivating ISR in connection with completion of the inter-RAT mobility procedure and based on determining that the UE has previously registered in the routing or tracking area of the second network; and initiating a location management procedure in the second network.

\* \* \* \* \*